Figure 3:
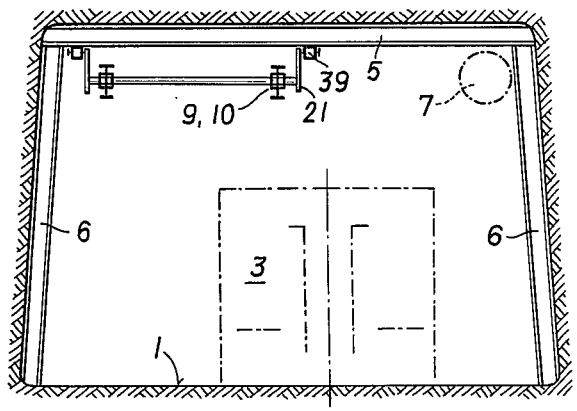

United States Patent [19]

Sigott et al.

[11] 4,075,856

[45] Feb. 28, 1978

[54] DEVICE FOR CONSECUTIVELY SUPPORTING A DRIFT

[75] Inventors: Siegfried Sigott; Alfred Zitz, both of Zeltweg; Wilhelm Althaler, Vienna; Helmut Wlach, Zeltweg, all of Austria

[73] Assignee: Vereinigte Osterreichische Eisen- und Stahlwerke-Alpine Montan Aktiengesellschaft, Vienna, Austria

[21] Appl. No.: 732,376

[22] Filed: Oct. 14, 1976

[30] Foreign Application Priority Data

Oct. 14, 1975 Austria ................................ 7839/75

[51] Int. Cl.² .................... E21D 15/582; E21D 15/58
[52] U.S. Cl. .................................. 61/45 C; 61/45 D; 61/42; 61/84
[58] Field of Search .................... 61/45 C, 63, 84, 85, 61/45 D, 45 R, 42

[56] References Cited

U.S. PATENT DOCUMENTS 3,247,675  4/1966  Winberg ................................ 61/84
3,905,645  9/1975  Bland .................................... 61/85 X

FOREIGN PATENT DOCUMENTS 1,016,551  11/1952  France ................................. 61/45 C
2,253,670   5/1974  Germany ............................. 61/45 C
1,187,213   2/1965  Germany ............................. 61/45 C
1,014,053   8/1957  Germany ............................. 61/45 C
2,215,978  10/1973  Germany ............................. 61/45 C Primary Examiner—Dennis L. Taylor
Attorney, Agent, or Firm—Cushman, Darby & Cushman

[57] ABSTRACT

Device for consecutively supporting a drift by means of caps and posts or props in dependence on face advancement, said device being designed for lifting and for pressing the caps to be positioned against the mine roof, characterized in that a breast frame is provided for being suspended to the positioned caps in a manner to be shiftable in direction of face advancement, lifting beams forming a support for the caps to be positioned being supported on said breast frame for being lifted in upward direction and a crane being guided on the breast frame for being shifted in direction of face advancement.

14 Claims, 8 Drawing Figures

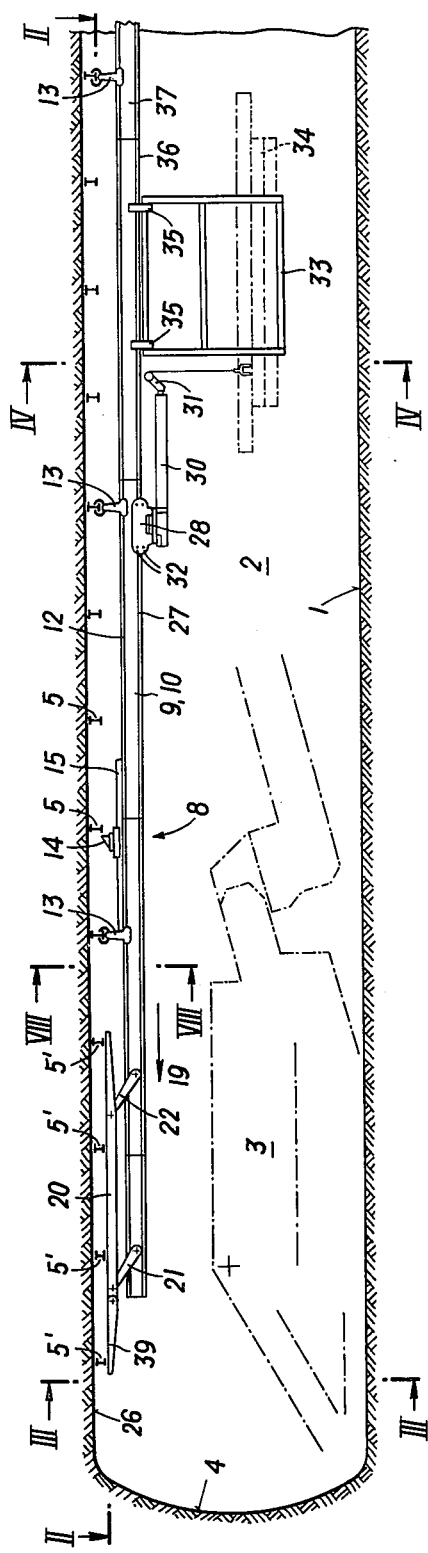
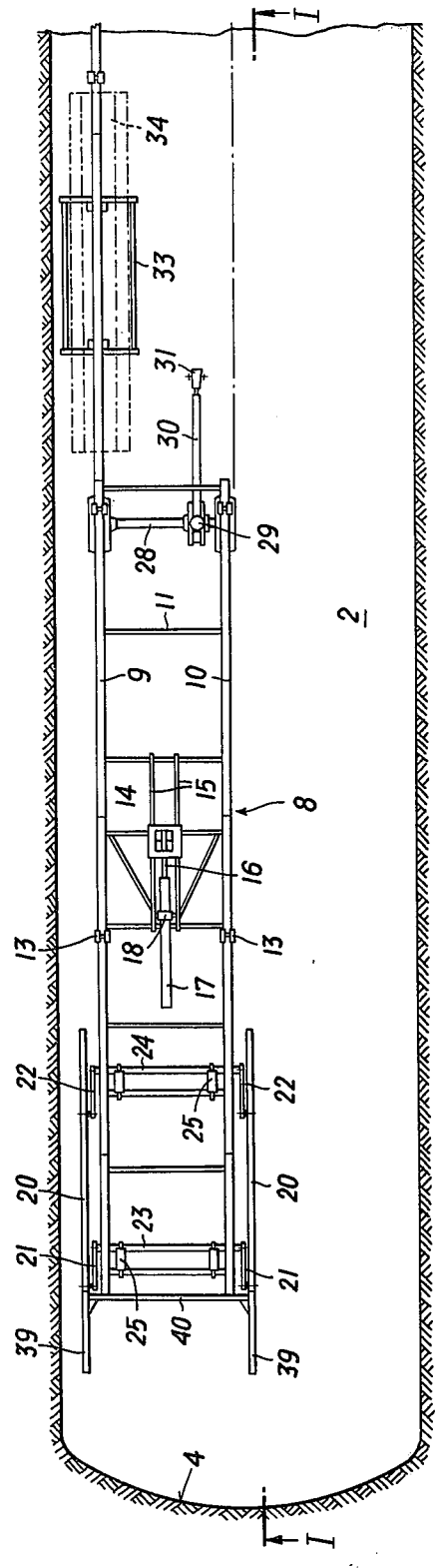

DEVICE FOR CONSECUTIVELY SUPPORTING A DRIFT

When advancing a drift, which, as a rule, is effected by a cutting machine, the profile cut into the rock or into the seam must be supported by supporting means comprising caps and posts or props, noting that the supporting frames are consecutively being put in place in dependence on the face advancement. In stable rock, face advancement can be effected for a plurality of supporting frame units, whereupon several supporting frames are simultaneously put in place. The more fragile is the roof of the mines, the closer to the mine face must be put in place the supporting means, so that, with a mine roof of bad condition, mine face advancement can only be effected for one supporting frame unit and a supporting frame must immediately be put in place. Positioning of supporting frames, which consist of cap and post or props, is time-consuming and difficult in view of the heavy weights of caps and props. Manually positioning the supporting frames can only be effected with the cutting machine retracted to an inoperative position, because only when interrupting the cutting work the operating personel is not hindered. In such a case, special shift personel is, as a rule, required to do the necessary work during the operating pause of the cutting machine, what, however, results in a substantial loss of time.

There have been proposed devices comprising a lifting apparatus for lifting the caps in accordance with face advancement to the mine roof and for pressing these caps against the mine roof, whereupon the caps are being supported by means of posts or props. Known devices of this type rest on the mine floor and reduce the accessible width of the drift and thus obstruct within the drift the movement of transportation means and face advancing equipment. This results in the requirement to cut a drift of relatively great width.

The invention now aims at avoiding the above mentioned drawbacks and to provide a device for consecutively supporting a drift by means of caps and posts or props in dependence on face advancement, said device being designed for lifting and for pressing the caps to be positioned against the mine roof. The invention essentially consists in that a breast frame is provided for being suspended to the positioned caps in a manner to be shiftable in direction of face advancement, lifting beams forming a support for the caps to be positioned being supported on said breast frame for being lifted in upward direction and a crane being guided on the breast frame for being shifted in direction of face advancement. In this manner, the mine supporting work can be mechanized without obstructing the width of the space required for the mine traffic and for moving the face advancing equipment. The breast frame can be suspended above the cutting machine and the crane provides the possibility to put the caps on the lifting beams without being required to rest on the drift floor. While effecting the mine roof supporting work, the cutting machine can be kept in place and can even be operated while effecting the mine roof supporting work, because, when effecting this mine roof supporting work by means of the crane and of the lifting means, the operating space for the cutting machine is unobstructed. In view of the breast frame being shiftable in direction of face advancement, the mine roof supporting work can be continuously effected in dependence on the face advancement, and in view of the lifting beams pressing the caps put on the lifting beams against the mine roof, the mine roof can already be supported prior to placing the posts or props into position. By means of this crane it is also possible to bring the posts or props into their respective position so that the narrow accessible space existing between the cutting machine and the side walls of the drift is sufficient for the operating personel to finally place the posts or props at the area of these side walls.

In view of extensively mechanizing the mine roof supporting work by using said crane and said lifting beams, substantial savings in operating personel are achieved.

According to the invention, the breast frame is conveniently made of two girders of I-shaped cross section, said girders extending in longitudinal direction of the drift and being laterally spaced and being mutually connected by means of transverse bars, the caps being put on said girders by means of said crane. According to the invention, the crane conveniently is a rotary crane being equipped with an extensible crane jib, particularly with a telescoping crane jib.

According to a preferred embodiment of the invention, the suspension means for the breast frame are guided on the upper flanges of both girders while the crane is travelling on the lower flanges of said both girders of the breast frame. This arrangement provides the possibility to move the crane over the whole length of the breast frame without the movement of the crane being obstructed by the suppension means. According to the invention, the rotatable crane jib of the crane is preferably arranged on a crane carriage in off-center position and adjacent to one of the girders of the breast frame, said crane carriage being guided on both girders of the breast frame and the breast frame conveniently being arranged for being suspended in an off-center position relative to the cross section of the drift and the crane jib being arranged adjacent to that girder of the breast frame which is adjacent to the middle of the cross section of the drift.

According to the invention the suspension means are conveniently designed for being subjected to tension load as well as to pressure load. This provides the advantage that the breast frame can be suspended to that cap of a supporting frame which is the cap located the nearest to the mine face, noting that these suspension means are tension-loaded, and that the breast frame can, with inter-position of the suspension means, be supported against a cap of a supporting frame located more distant from the mine face, said latter suspension means being pressure loaded, so that the breast frame can protrude in a cantillever fashion over the last positioned cap in direction to the mine face and is capable of supporting with its protruding end the lifting beams which are pressing the caps carried by them against the mine roof with sufficient force.

In a practical embodiment of a device according to the invention, the lifting beams are pivotally connected to the girders of I-shaped cross section of the breast frame by means of links, forming a parallelogram guide with the girders and the lifting beams, noting that the links, being located in the same cross section of the drift, of both girders of the breast frame are non-rotatably connected to a shaft. Hydraulic positioning means acting on said links can now be provided for rotating the shafts non-rotatably carrying said links and for pressing the caps put on the lifting beams against the mine roof.

The links are conveniently inclined in direction of face advancement so that the caps put on the lifting beams are, when being lifted against the mine roof, also moved in a direction opposite to the direction of face advancement. In this case, to the forward ends of the lifting beams, as seen in direction of face advancement, pivotal arms are pivotally connected for being lifted and lowered into a downwardly inclined position. Such pivotal arms, which equally can be swivelled in upward direction by hydraulic means, facilitate positioning of the caps on the lifting beams by means of the crane and additionally provide the possibility to lift and press only individual caps against the mine roof, which is of advantage with mine roofs of bad condition.

According to an advantageous embodiment of the invention the arrangement is such that between the girders of the breast frame a claw is arranged for being moved and guided in direction of face advancement, said claw being designed for being brought into engagement with a positioned cap and for being shifted in a direction opposite to the direction of face advancement by a drive means, preferably a hydraulic cylinder-piston-means. In this manner, the breast frame, which is slidingly guided within the suspension means connected to the positioned caps, can be advanced in dependence on progress of face advancement.

According to the invention, a track beam adapted for being suspended on the positioned caps and for carrying an overhead carriage can be arranged at the rearward end, as seen in direction of face advancement, of the breast frame. By means of this overhead carriage the material, such as caps and props, needed for erecting the mine support, can be brought into the circle of operation of the crane, noting that also in this case no track must be spared within the drift for transporting the material needed for erecting the mine support. According to a preferred embodiment of the invention, the track beam is formed of a girder having an I-shaped cross-section, noting that on the upper flange of said track beam the suspensions means is shiftably guided and that on the lower flange of said track beam the overhead carriage is running and that this track beam is connected with one of the girders, having an I-shaped cross section, of the breast frame. This allows to also advance the track beam simultaneously with advancing the breast frame in dependence on the progress of face advancement, noting that the hydraulic means provided for advancing the breast frame is also made use of for advancing a track beam. For example, a track beam having a length of approximately 25 m can be suspended on the caps for being shifted in longitudinal direction and in this case the material needed for erecting the mine support must be brought to the end of the track beam opposed to the breast frame by other means. In this case, it is convenient to unilaterally connect the platform of the overhead carriage, said platform being for example formed by two bent arms, with the suspension runner and to arrange said platform for being lifted and lowered relative to the suspension runner as in stacker trucks so that a stack of the material needed for erecting the mine support can be taken over in a simple manner from a correspondlingly designed car.

The invention is further illustrated with reference to the drawing showing an embodiment of the device according to the invention.

In the drawing

Figure 4:
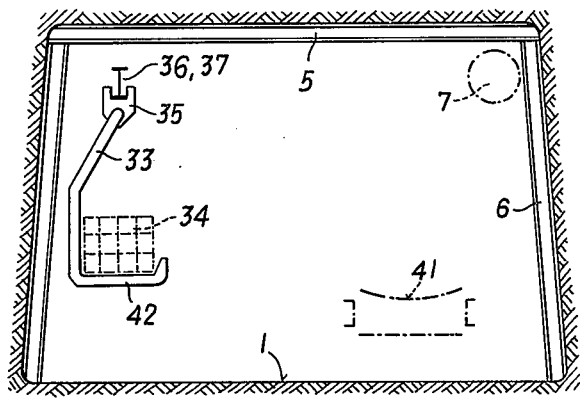
Figure 7:
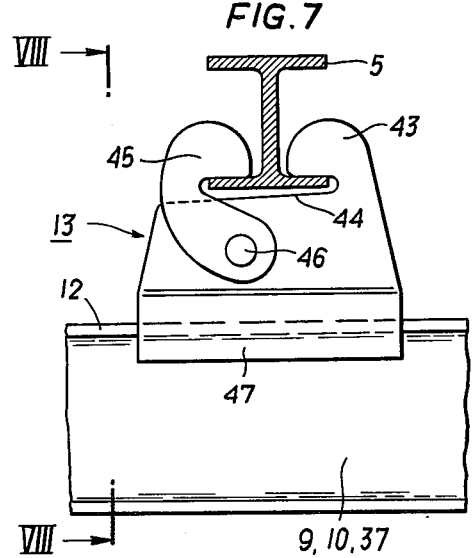
Figure 8:
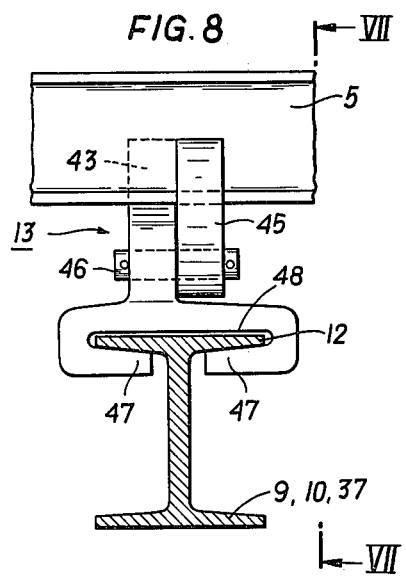
Figure 5:
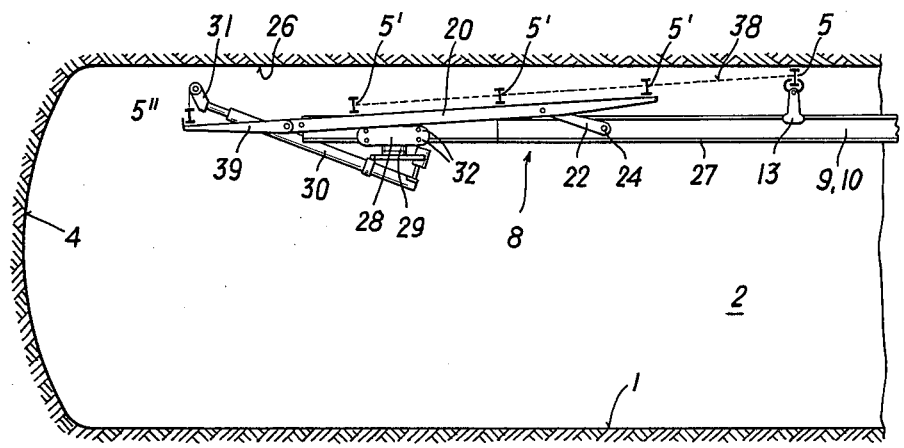
Figure 6:
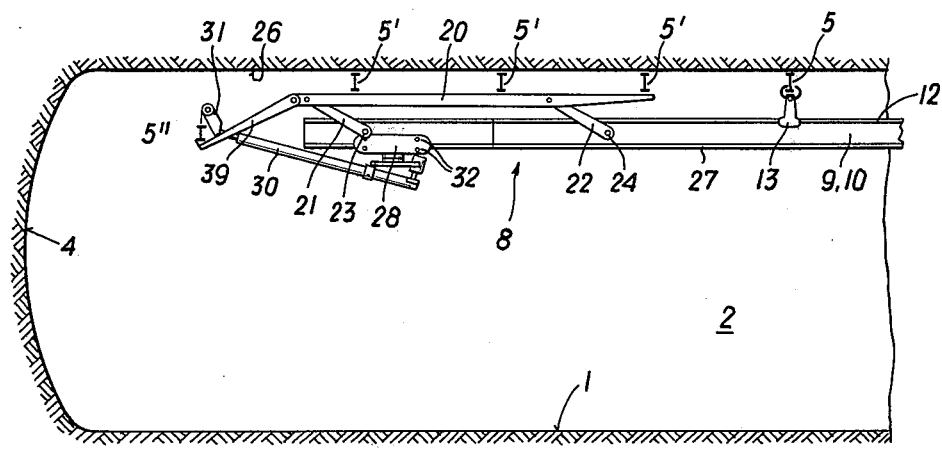

FIGS. 1 and 2 show the arrangement as a whole, noting that FIG. 1 represents a side-elevation in a section through the drift along line I—I of FIG. 2 and FIG. 2 represents a top plan view in a section through the drift along line II—II of FIG. 1, FIG. 3 represents a front elevation of the breast frame in a section through the drift along line III—III of FIG. 1, FIG. 4 represents a section through the drift along line IV—IV of FIG. 1, FIGS. 5 and 6 represent a side-elevation of the forward portion of the breast frame as is shown in FIG. 1, showing, however, the lifting beams in different positions, and FIGS. 7 and 8 represent in detail the suspensions means, noting that FIG. 8 shows a section along line VIII—VIII of FIG. 1 and of FIG. 7 and FIG. 7 shows a section along line VII—VII of FIG. 8.

1 is the floor of the drift 2 on which the cutting machine 3 is running, the contour of which is indicated by dash-dotted lines. 4 is the mine face just cut. 5 are caps which have already been positioned and which are supported by posts or props 6. The drawing is showing a so-called door frame mine support in which both, the caps 5 and the posts or props 6, are formed of beams of I-shaped cross section. The posts or props 6 can, however, be adjustable mine posts or props, and any other type of mine support can be provided, for example a vaulted mine support in which case the caps 5 are bent along an arc. 7 is the air duct suspended within the drift and serving for supplying fresh air. The contour of the transportation means provided within the drift is given the reference numeral 41.

On already positioned caps, a breast frame 8 is suspended by suspension means 13. This breast frame essentially consists of two longitudinal beams 9 and 10 formed of girders having an I-shaped cross section and of transverse bars 11 connecting said longitudinal beams 9 and 10. The upper flanges 12 of these longitudinal beams are slidably guided within the suspension means 13. 14 is a claw which is slidably guided within a guide way 15 fixed to the transverse bars 11 and which abuts against an already positioned cap 5. The piston 16 of a hydraulic cylinder 17 is acting on said claw 14, noting that the hydraulic cylinder 17 is supported at 18 against the guide way 15. By means of this hydraulic piston, the claw 14 can be pressed against the engaged cap 5 whereby the breast frame is advanced in direction of face advancement as indicated by the arrow 19.

Two lifting beams 20 are connected to the longitudinal beams 9 and 10 of the breast frame for being moved in upward and downward direction. These lifting beams 20 are connected to said longitudinal beams 9, 10 by means of links 21 and 22. Two links 21 each and two links 22 each are non-rotatably carried on the respective shafts 23 and 24 which are rotated by hydraulic cylinder-piston-means 25 acting, on the one hand, on the transverse bars 11 and, on the other hand on levers fixed to the shafts 23 and 24. The caps 5' to be positioned are being put on said lifting beams 20 and these caps 5' are pressed against the mine roof 26 when the lifting beams 20 assume the position shown in FIG. 1. In this manner, the mine roof is supported already prior to positioning the posts or props 6 for the caps 5'. The links 21, 22 are inclined in direction of face advancement so that the caps 5' are moved along an arc in upward and rearward direction when moving the links 21, 22 in upward direction. The links 21 are somewhat shorter than the links 22 so that in the lowered positions of the lifting beams 20 as shown in FIG. 5, these lifting beams assume an inclined position.

A crane carriage 28 is guided in longitudinal direction of the longitudinal beams 9, 10 on the lower flanges 27 of both longitudinal beams 9 and 10. The crane is a rotary crane and comprises a rotary arm 30 being rotated around a trunnion 29 and having arranged at its free end a hoisting apparatus. The rotary arm 30 is extensible in a telescopic manner. The trunnion of the crane is arranged adjacent that longitudinal beam 9 of the breast frame 8 which is arranged near the center of the drift, so that the whole floor area of the drift is within the operating range of the rotary arm 30 of the crane. The crane carriage 28 is guided by means of roller pairs 32 which are engaging the lower flange 27 on both sides thereof. The path of movement of the crane carrier 28 is thus not obstructed by the transverse bars 11, the suspension means 13 and the shafts 23, 24, so that the crane carriage can be moved on the breast frame 8 from the rearmost position shown in FIG. 1 into the foremost position shown in FIG. 5.

33 is an overhead carriage by means of which the material required for erecting the mine support and indicated by dash-dotted lines 34 can be transported to the breast frame 8 where this material, as is shown in FIG. 1, can be taken over by the hoisting apparatus 31 of the crane 28, 29, 30. The suspension runner 35 of this overhead carriage 33 is running on the lower flanges 36 of a track beam 37 which again is suspended on positioned caps 5 by suspension means 13. The cross section of this track beam can be the same as that of the longitudinal beams 9, 10. The caps taken from the overhead carriage 33 by means of the crane 28,29,30,31 are now being transported to the foreward end of the breast frame 8 and put on the lifting beams 20 as shown in FIG. 5. Subsequently, the caps can manually or by means of a chain pull or a tackle 38 be shifted in rearward direction into the position in which the caps are to be lifted against the mine roof 26.

Pivotal arms 39 are pivotally connected to the foreward end of the lifting beams 20, said pivotal arms 39 arranged for being moved into a downwardly inclined position. These both pivotal arms 39 again are connected by a shaft 40 which again can be rotated by a hydraulic drive not shown. In the stretched position shown in FIG. 5, these pivotal arms 39 represent an extension of the lifting beams 20, so that, as is shown in FIG. 5, four caps 5' can be put on the lifting beams extended by the pivotal arms and simultaneously be pressed against the mine roof as shown in FIG. 1 by means of the lifting beams 20 being elongated by the pivotal arms 39. The pivotal arms 39 can, however, also be moved in downward direction into a position 39' shown in FIG. 6. In this case three caps 5' can be pressed against the mine roof by means of the lifting beams 20, whereas the fourth cap 5" can separately be lifted and pressed against the mine roof by means of the pivotal arms 39. These pivotal arms 39 are designed and acting similar to the breast caps of the mine support.

In the embodiment shown in the drawing, the track beam 37 is immediately connected and fixed to the longitudinal beam 10 of the breast frame 8. This track beam 37 is, as has already been mentioned, shiftably supported within suspension means 13 and is thus advanced by means of the hydraulic cylinder-piston-means 17,16 in dependence on the progress of face advancement.

As is shown in FIG. 4, the overhead carriage is only unilaterally connected with the suspension runner 35 so that the material required for erecting the mine support can be lifted out from the open side. The platform 42 of this overhead carriage 33, which platform can for instance be formed of two bent arms, can be connected to the suspension runner 35 for upward and downward movement (not illustrated) as in stacking trucks, so that the material 34 required for erecting the mine support can easily be handled.

An example for the construction of the suspension means 13 is shown in FIGS. 7 and 8 in an enlarged scale. This suspension means is positively engaging with a hook-like part 43 the lower flange of a positioned cap 5 being formed of a beam of I-shaped cross section. The suspension means is thus supported in direction of acting tension forces by means of the hook-like part 43 and supported in direction of acting pressure forces by means of the abutting surface 44 resting on the cap 5. 45 is a hook which can be swivelled around a pivotal point 46 and which secures in position the suspension means 33 being put on cap 5. The upper flange 12 of the longitudinal beams 9, 10 or of the track beam 37 is positively engaged by means of two claws 47 of the suspension means 13. The longitudinal beams 9, 10 and the track beam 37 are thus supported in direction of acting pressure forces by means of an abutment surface 48 and supported in direction of acting tension forces by means of the claws 47. The abutment surface 48 and the upper surfaces of the claws 47 are forming sliding surfaces between which the longitudinal beams 9, 10 and the track beam 37, respectively, can be shifted. Of course, instead of such sliding surfaces also roller guides can be provided.

What we claim is:

1. Device for supporting a drift by means of caps and posts comprising
    a breast frame, suspension means carried by said breast frame for suspending said breast frame from already installed caps so as to be movable relative to the installed caps toward the face of the drift, said breast frame including two girders disposed to extend in the longitudinal direction of the drift, and laterally spaced from each other, said girders being mutually connected by a plurality of transverse bars,
    lifting beams supported on said breast frame for movement toward and away from said breast frame whereby caps carried on said lifting beams are movable toward the ceiling of the drift,
    a rotary crane carried by said breast frame, means for moving said rotary crane on said breast frame toward and away from the face of the drift, said rotary crane having an extensible jib.

2. The device as claimed in claim 1 wherein said girders each have I-shaped cross sections with upper and lower flanges and said means for moving said rotary crane cooperate with said lower flanges of said girders to support said rotary crane.

3. The device as claimed in claim 1 wherein said extensible gib of said rotary crane is telescopically extendable.

4. The device as claimed in claim 1 wherein said gib of said rotatable crane is mounted on a crane carriage which extends between said girders and said crane carriage is disposed closer to one of said girders than the other of said girders on said breast frame, said crane carriage being guided on said girders of said breast frame and said breast frame being suspended in an off-center position relative to the longitudinal axis of said drift with said jib of said rotary crane being adjacent to the one of said girders which is closest to the center axis of the drift.

5. The device as claimed in claim 4 wherein said suspension means include means for resisting both a tension load and a pressure load.

6. The device as claimed in claim 2 wherein said lifting beams are connected to said girders by linking arms with said girders, said linking arms and said lifting beams forming a parallelogram, the linking arms on one side of said parallelogram and the linking arms on the opposite side of said parallelogram being each non-rotatably connected to a shaft.

7. The device as claimed in claim 6 wherein said linking arms are inclined towards the end of said breast frame adjacent to the face of the drift when said device is in position in a drift.

8. The device as claimed in claim 6 wherein said breast frame has a forward end and said linking arms on said one side of said parallelogram are located adjacent said forward end of said breast frame and are shorter in length than the linking arms located on the opposite side of said parallelogram.

9. The device as claimed in claim 1 wherein said lifting beams have forward ends in the form of pivot arms, said arms being pivotable about an axis extending generally perpendicular to the direction of travel of said breast frame between a lifted and a lowered position with respect to said lifting beams.

10. The device as claimed in claim 1 wherein, between said girders of said breast frame, at least one claw means is disposed for engaging an installed cap and hydraulic means are provided for cooperating with said claw means for shifting said breast frame towards the face of the drift when said claw means is engaged with an installed cap.

11. The device as claimed in claim 1 wherein said device further comprises a track beam connected to said breast frame at an end thereof opposite said lifting beams, means for suspending said track beam from already installed caps and an overhead carriage is provided on said track beam.

12. The device as claimed in claim 11 wherein said track beam is a girder having an I-shaped cross section including an upper flange for cooperating with said suspending means whereby said track beam is shiftable relative to said suspending means and a lower flange for carrying said overhead carriage.

13. The device as claimed in claim 11 wherein said overhead carriage has a platform comprising two bent arms and a suspension runner for cooperating with said track beam whereby said platform is movable between a raised and lowered position relative to said suspension runner.

14. Device as claimed in claim 2, characterized in that the suspension means (13) for the breast frame (8) are guided on the upper flanges (12) of both girders (9, 10) having I-shaped cross section.

* * * * *